INVENTORS
FRED G. BURG
SOCRATES LENDERS
BY Flam and Flam
ATTORNEYS.

3,444,446
FINE-MEDIUM-COARSE SERVOMOTOR POSITION CONTROL
Fred G. Burg, Los Angeles, and Socrates Lenders, Wilmington, Calif., assignors, by mesne assignments, to Houdaille Industries, Inc., Buffalo, N.Y., a corporation of Michigan
Filed June 24, 1965, Ser. No. 466,688
Int. Cl. H02p 1/00, 5/46
U.S. Cl. 318—18                                                     11 Claims

ABSTRACT OF THE DISCLOSURE

Apparatus for controlling the indexing of a turret having a number of selected positions including means for selecting a desired position, means which produces a signal corresponding to the deviation of the turret from its selected position and a pair of two-state logic elements connected to the selecting means and the turret and switched upon predetermined signal levels such that the turret drive motor operates at different speeds dependent upon the state of the logic elements. The drive motor operates with plural speeds so as to assure that rapid change in turret position may be obtained and thus a very high speed, a moderate speed, and a slow final positioning speed is utilized.

---

Figure 1:
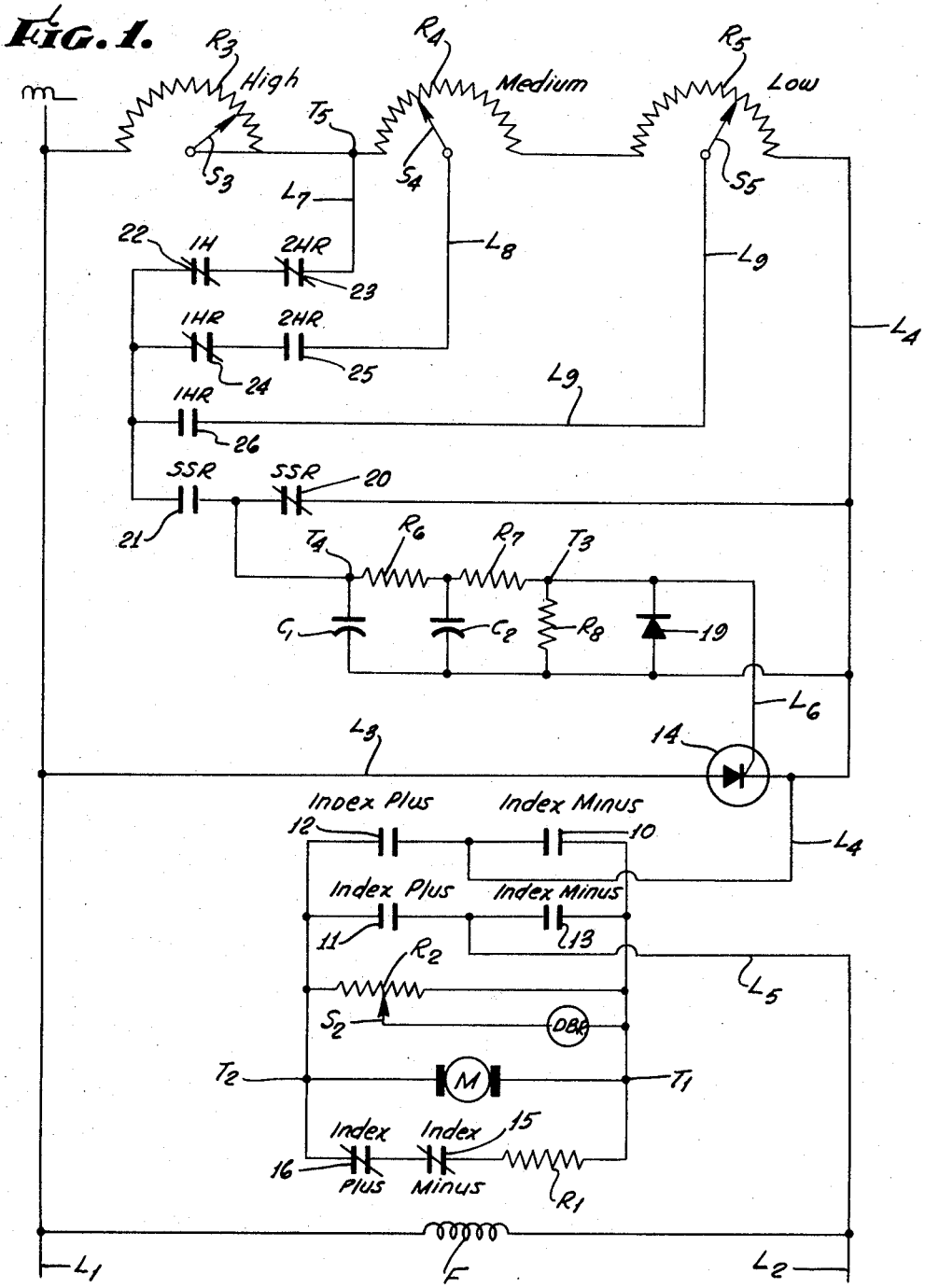

This invention relates to a machining center, and particularly to a machining center of the type shown and claimed in the copending application of Fred G. Burg entitled "Turret Machine Having Tool Store," filed Mar. 1, 1965.

In said copending application, there is shown a turret on which twenty quills are mounted. The turret is selectively movable in either direction in order to bring any quill into operative relationship with respect to the work, the power shaft, and the feed mechanism. A shot pin cooperable with one of twenty recesses, accurately locates the turret in home position. A clamping device holds the turret in the position determined by the shot pin. The turret may be commanded to move to a different position, either by a manually operable selector switch, or by a coded message. The turret has a substantial mass; accordingly, the shot pin should enter the recess corresponding to the selected quill when the turret is moving at a very slow speed. If the turret is far from the intended position when a new signal is given, a high speed is required to effect quick repositioning. Accordingly, an object of this invention is to provide a speed control system utilizing conventional components that provides an automatic reduction in speed to the desired low value as the turret approaches the selected position.

Another object of this invention is to provide a speed control system of this character in which the characteristic curve of speed vs. position deviation can be readily shaped for most efficient operation under varying load conditions of the turret.

Another object of this invention is to provide a speed control system of this character that appropriately determines the extent of energization of a D.C. shunt motor, or the existence of a dynamic braking circuit in order to achieve efficient turret indexing.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claims.

Figure 2:
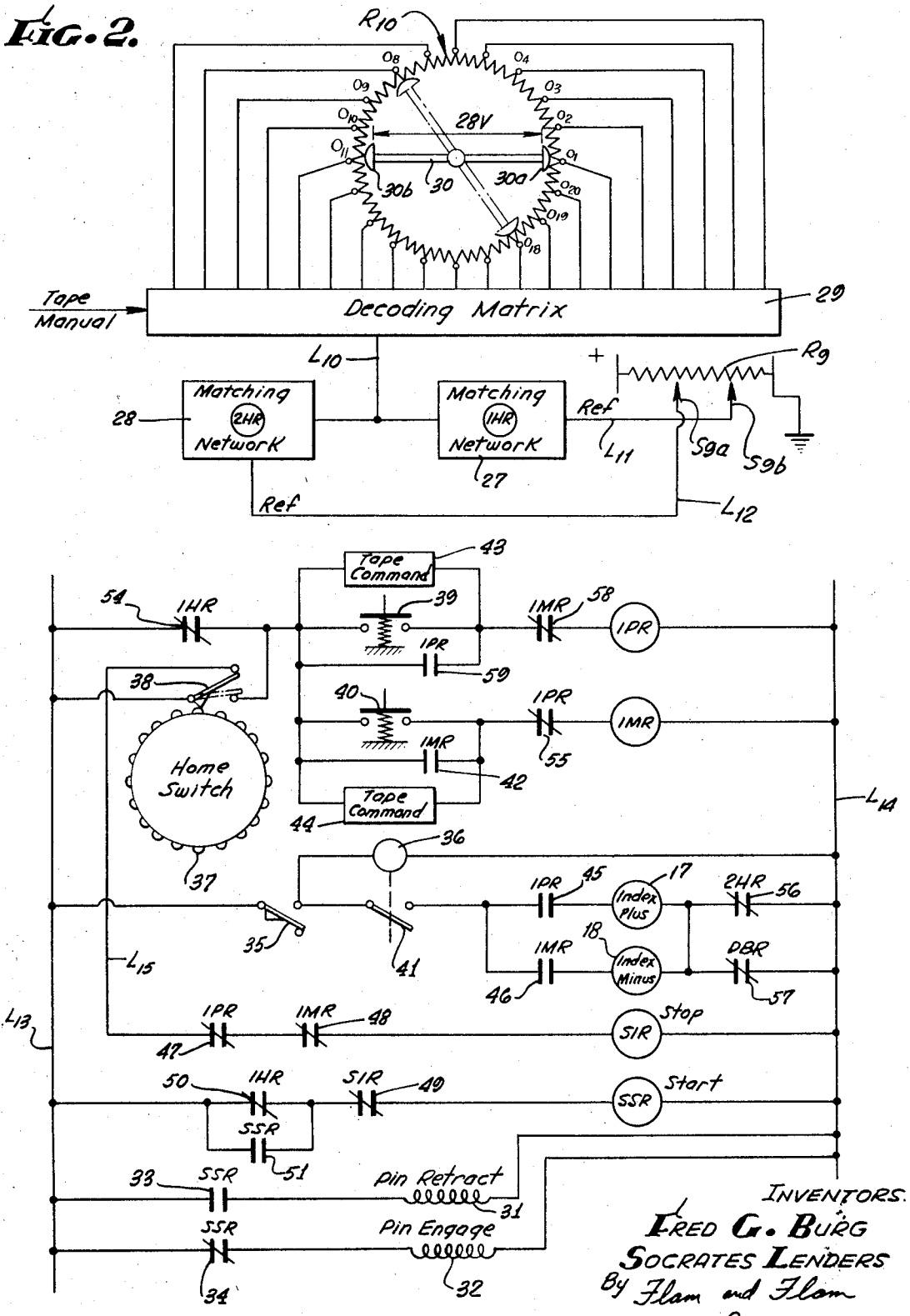
Figure 3:
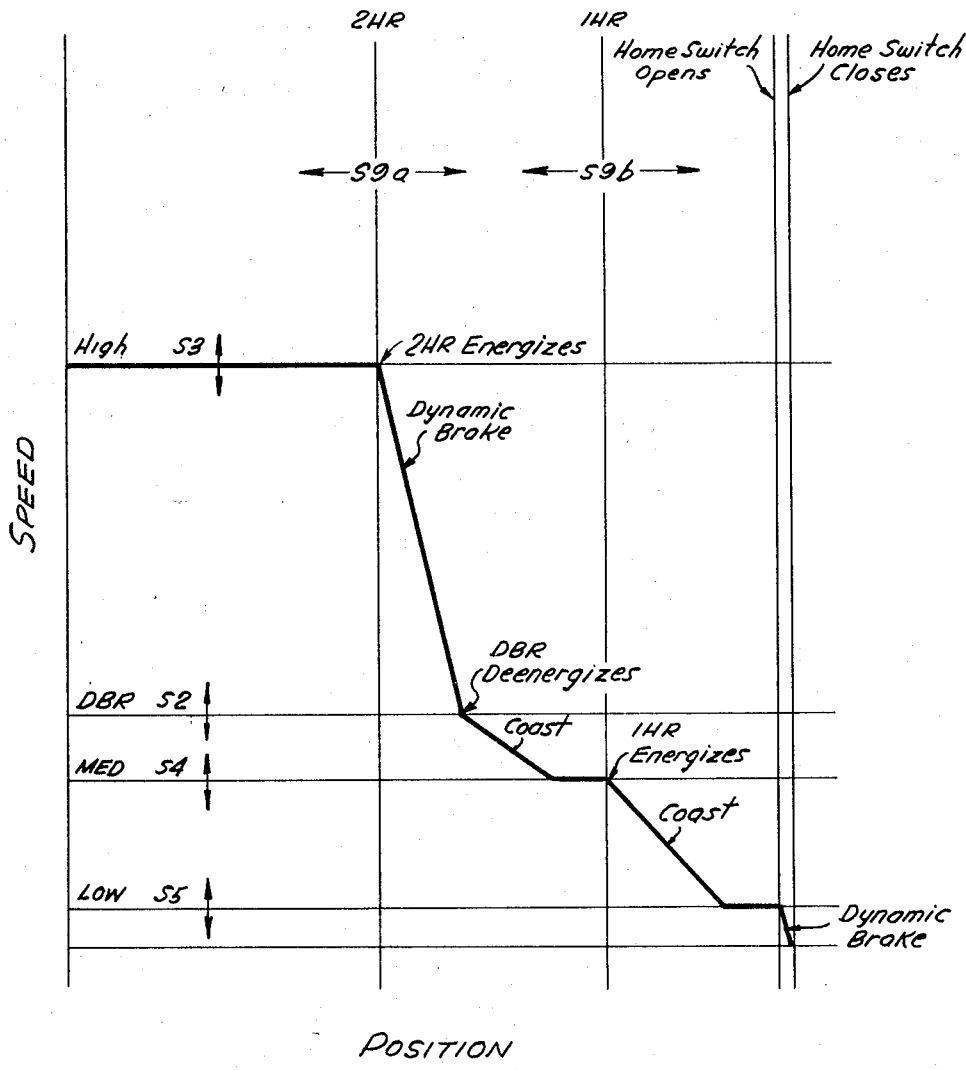

Referring to the drawings:

FIGURES 1 and 2 together comprise a schematic diagram of a speed control system incorporating the present invention; and FIG. 3 is a graphical representation of the speed characteristic of the motor controlled by the system shown in FIG. 1.

In FIG. 1 there is illustrated an armature M and a field winding F of a D.C. motor that indexes the turret (not shown). The armature M and the field winding F are both designed to be energized from supply lines $L_1$ and $L_2$. These lines carry full wave rectified current derived from an A.C. supply line (not shown).

The field winding F is directly connected across the lines $L_1$ and $L_2$. The armature M is connected to the supply lines $L_1$ and $L_2$ for rotation in one direction through normally open relay contacts 10 and 11, and for rotation in the other direction through normally open relay contacts 12 and 13. A silicon controlled rectifier (SCR) 14 controls the average voltage passed to the motor armature, and hence its speed.

A lead $L_3$ connects the anode of the SCR 14 to the line $L_1$. The relay contacts 10 connect a lead $L_4$ from the SCR cathode to one terminal $T_1$ of the armature M while the relay contacts 11 connect the opposite terminal $T_2$ of the motor armature M to the other supply line $L_2$ via a lead $L_5$. Alternately, the relay contacts 12 connect the cathode lead $L_4$ to the terminal $T_2$ while the relay contacts 13 connect the opposite terminal $T_1$ to the lead $L_5$.

The armature M also has a dynamic braking circuit paralleling the terminals $T_1$ and $T_2$. This comprises a dynamic braking resistor $R_1$ and serially associated normally closed relay contacts 15 and 16. In order appropriately to operate the relay contacts 10, 11, 12, 13, 15 and 16 power relays 17 and 18 (FIG. 2) are provided. These relays are labeled INDEX PLUS and INDEX MINUS. INDEX PLUS relay 17, when energized, closes the contacts 12 and 13 and opens the contacts 16. Thus the dynamic braking circuit for the armature M is opened while power is applied to the armature from the line $L_1$, contacts 12, terminal $T_2$, the armature M, the terminal $T_1$, the contacts 13 to the lead $L_5$ and line $L_2$. Symmetrically, operation of the relay INDEX MINUS causes operation of the motor in the opposite direction and similarly opens the dynamic braking circuit at the contacts 15.

A potentiometer resistor $R_2$ of relatively high ohmic value as compared with the resistor $R_1$ parallels the motor armature. A slider $S_2$ connects a dynamic braking relay across a portion of this resistor $R_2$ for control purposes hereinafter to be described.

While the relays INDEX PLUS and INDEX MINUS determine the direction of motion, the speed is determined by the average voltage applied to the terminals $T_1$ and $T_2$. A phase shift network connected to the anode lead $L_3$, the gate lead $L_6$, and the cathode lead $L_4$ determines the firing angle of the SCR 14. This phase shift network has two RC sections. The first RC section comprises in addition to a condenser $C_1$, parts of three potentiometer resistors $R_3$, $R_4$ and $R_5$, the parts being selected in a manner to be hereinafter described. The second RC section comprises a fixed resistor $R_6$ and a condenser $C_2$. The gate lead $L_6$ is connected to an intermediate terminal $T_3$ between voltage dividing resistors $R_7$ and $R_8$ that properly scale the voltage applied to the gate. A reversely polarized diode 19 parallels the gate and cathode leads $L_6$ and $L_4$ and prevents the build up of a negative voltage on the gate, thus protecting the SCR 14. The resistors $R_3$, $R_4$ and $R_5$ are serially connected, and together are placed across leads $L_3$ and $L_4$. One of three tap leads $L_7$, $L_8$ or $L_9$ is connected to the terminal $T_4$ between the resistor $R_6$ and condenser $C_1$ of the phase shift network. The value of resistance in the first RC section depends not only upon which tap lead is selected, but also upon the setting of sliders $S_3$, $S_4$ and $S_5$ respectively associated with the resistors $R_3$, $R_4$ and $R_5$. The tap leads $L_8$ and $L_9$ are respectively connected to the sliders $S_4$ and $S_5$. The tap lead $L_7$ is connected to a terminal $T_5$ between resistors $R_3$ and $R_4$ while the slider $S_3$ is connected to one end of its resistor $R_3$.

The leads $L_7$, $L_8$ and $L_9$ are selected by the operation of relays 1HR and 2HR and controlled by a start relay SSR (FIG. 2). The relay 1HR operates when the turret is less than one full station away from its desired position, and the relay 2HR operates when the turret is less than a certain number of stations away from the desired position. The relay SSR operates as soon as a command is given for the turret to move. The manner in which the relays 1HR, 2HR and SSR are operated will be described hereinafter.

The start relay SSR has normally closed contacts 20 that connect the phase shift terminal $T_4$ to the cathode lead $L_4$ normally to determine minimum SCR conduction. The start relay SSR has normally open contacts 21 that, when closed, serve to connect one of the tap leads $L_7$, $L_8$, or $L_9$ to the phase shift terminal $T_4$ to determine various conduction states of the SCR.

Both relays 1HR and 2HR have serially connected, normally closed contacts 22 and 23 in the tap lead $L_7$. Normally closed contacts 24 of relay 1HR and normally open contacts 25 of relay 2HR are serially associated with the tap lead $L_7$, and normally open contacts 26 of relay 1HR are inserted in the tap lead $L_9$. Assuming that relay SSR has been energized, then if the turret is far from a desired position, the relays 1HR and 2HR will not be energized. Hence, the tap lead $L_7$ will be connected to the phase shift network, and leads $L_8$ and $L_9$ will be idle. The average voltage will be at a high value determined by the slider $S_3$, and the turret motor will be conditioned for operation at a relatively high speed. When the turret approaches the desired station, lead $L_7$ is switched out of the circuit and leads $L_8$ and $L_9$ successively are switched into the circuit.

In order to operate the relays 1HR and 2HR at a suitable time, a signal must be derived from the turret which represents the departure of the turret from the desired position. This signal is applied through lead $L_{10}$ both to a logic or matching network 27 for the relay 1HR and to a logic or matching network 28 for the relay 2HR. If adequate power is available, the networks 27 and 28 can be omitted, and the relays 1HR and 2HR, if polarized and voltage sensitive, can be directly connected between the leads. The networks may include power transistors controlling the relays 1HR and 2HR in turn controlled by trigger circuits.

The signal at the lead $L_{10}$ is in the form of a .DC. voltage. It is compared with D.C. reference voltages provided at sliders $S_{9a}$ and $S_{9b}$ cooperable with a potentiometer resistor $R_9$. A suitable .DC. voltage is applied across the resistor $R_9$. A lead $L_{11}$ connected to slider $S_{9b}$ applies a reference voltage to the matching network 27 for comparison with the signal voltage at the lead $L_{10}$, and a lead $L_{12}$ connected to slider $S_{9a}$ applies a reference voltage to the network 28. When the signal voltage at the lead $L_{10}$ substantially corresponds to the reference voltage of the lead $L_{12}$, the relay 2HR is operated, and when the signal voltage at $L_{10}$ further drops to a value to match that of the reference of the lead $L_{11}$ the relay 1HR is operated.

In order to provide a suitable signal directly proportional to the deviation of the turret from its desired home position, a circular potentiometer resistor $R_{10}$ is provided. The potentiometer resistor $R_{10}$ has twenty equi-angularly spaced taps 01, 02, 03, 04, 05, 06, 07, 08, 09, 010, 011, 012, 013, 014, 015, 016, 017, 018, 019 and 020. These taps are connected to corresponding terminals of a decoding matrix 29 which includes a plurality of two-state logic elements. Cooperable with the potentiometer resistor $R_{10}$ is a rotor 30 that is angularly moved in 1 to 1 synchronism with the turret. Thus, for each angularly position of the turret, there is an angular position of the rotor 30. The rotor 30 carries two diametrically opposite wipers $30a$ and $30b$ between which a fixed direct current potential is continuously impressed, as by the aid of suitable slip rings (not shown). In the position of the rotor indicated in FIG. 2, the turret is at a position corresponding to station #1, and brush 30 is opposite terminal 01. In the phantom line position of the rotor indicated in FIG. 2, the turret is at a position corresponding to station #8, and the rotor brush $30a$ is opposite terminal 01. The voltage at each of the taps 01, 02, 03, 04 . . . 020 is a measure of the departure of the turret from the positions corresponding to the taps. Thus in the full line position of the rotor, the voltage on the tap 011 is at a maximum indicating that the turret is at its farthest possible position from 011. But the voltage at tap 01 is zero, indicating the turret is at station #1.

The turret has twenty equiangularly spaced registers cooperable with a retractable locating pin (not shown) for accurately determining one of twenty positions of the turret. The pin and the registers are tapered so that the pin enters a register before the home position is determined. A cam action between the pin and the corresponding register brings the turret home. This locating pin is retracted by a solenoid 31 and projected by a solenoid 32. A circuit for the solenoid 31 between D.C. supply lines $L_{13}$ and $L_{14}$ is controlled by normally open contacts 33 of the start relay SSR. The circuit for the solenoid 32 is controlled by normally closed contacts 34 of the start relay SSR. Thus when the start relay is energized, the pin is retracted and when de-energized the pin is projected.

When the locating pin is retracted, the turret is unclamped. For this purpose a cam switch 35 is provided that operates an actuator 36, retraction of the pin closing the switch 35.

For appropriately controlling the start relay SSR and the rotor controlling relays 17 and 18 there are provided a stop relay SIR, main relays IPR and IMR, a twenty lobed home cam 37 and associated switch 38, start switches 39 and 40 and a safety switch 41 that closes when the turret is unclamped. Also provided are suitable devices 43 and 44 operated by tape or the like, for paralleling the manular start switches 39 and 40. Holding contacts 42 parallel start switch 40 to maintain the circuit if manual starting is used. These contacts are operated by relay IMR. Relays IPR and IMR determine, respectively, clockwise and counterclockwise rotation of the turret and rotor 30.

The cam 37 causes the switch 38 to move into the full line position only when the locating pin is capable of entering one of the turret registers.

Assuming that the turret is in a state of rest at the selected #1 position, then lead $L_{10}$ is connected to terminal 01; consequently the relays 1HR and 2HR will both be energized. Furthermore the home switch 38 will be in the full line position illustrated. Circuits for the main relays IPR and IMR are interrupted since, in a manner hereinafter to be described, these energization circuits depend either upon the home switch 38 being away from a home position or upon the relay 1HR being deenergized. The INDEX PLUS and INDEX MINUS relays 17 and 18 will be deenergized because normally open contacts 45 and 46 of the IPR and IMR relays are serially associated respectively with the INDEX PLUS and INDEX MINUS relays 17 and 18. The contacts 10–13 are all open; hence no power may be passed to the armature terminals $T_1$ and $T_2$. The stop index relay SIR will be energized; its energization circuit may be traced from the line $L_{13}$, home switch 38, the lead $L_{15}$, normally closed contacts 47 and 48 of the deenergized IPR and IMR relays, the stop index relay SIR to the lead $L_{14}$. The start relay SSR has an energization circuit that includes, in series, normally closed contacts 49 of the energized stop index relay SIR. Hence the start relay SSR is deenergized. The energization circuit for the start index relay SSR also serially includes normally closed contacts 50 of the 1HR relay and holding contacts 51 operated by the start relay SSR and which parallel the normally closed relay contacts 50. Since the start relay SSR is deenergized, the solenoid 32 is energized and the locating pin is projected. Since the start relay SSR is deenergized, the terminal $T_4$ in the phase shift network is connected to the cathode lead $L_4$, and the SCR is at minimum conduction.

By way of example, it may now be assumed that a signal is read from a tape commanding the turret to move in a counterclockwise direction to station #8. Accordingly the terminal 08 is connected through the matrix 29 to the lead $L_{10}$ and start switch 40 is paralleled by the device 44. Optionally it may be assumed that a manual selector switch paralleling the matrix 29 connects terminal 08 to lead $L_{10}$ and that start switch 40 is closed. Since the rotor 30 is far from the phantom line position illustrated, both the relays 1HR and 2HR will now be deenergized. A circuit is then established for the main relay IMR. This circuit may be traced as follows: line $L_{13}$, normally closed relay contacts 54 of the relay 1HR (which have just closed), tape command device 44, normally closed interlock contacts 55 of the companion main relay IPR, relay IMR to lead $L_{14}$.

On energization of the main relay IPR, the circuit for the stop index relay SIR is interrupted. This occurs by virtue of the opening of contacts 48. Accordingly stop index relay contacts 49 close, and a circuit is now established for the start relay SSR. Energization of the start relay SSR causes closure of holding contacts 51, and accordingly this relay will continue in operation until such time as the stop index relay SIR is subsequently energized.

Energization of the start relay SSR causes the pin retract solenoid 31 to be energized and the pin engage solenoid 32 to be deenergized. The cam switch 35, which responds to retraction of the locating pin, then closes, and in turn energizes the actuator 36. The safety switch 41 indicates that the turret is unclamped. A circuit is then established for the INDEX MINUS relay 18 as follows: line 13, switches 35 and 41, contacts 46 of the relay IMR, relay 18, and then either normally closed contacts 56 on the relay 2HR or normally closed contacts 57 of the dynamic brake relay DBR. At this instant, both contacts 56 and 57 are closed; but contacts 57 open almost immediately as will presently appear. Operation of the INDEX MINUS relay 18 causes closure of contacts 10 and 11 for energization of the motor armature M to drive the turret in the counterclockwise direction, and also causes opening of the dynamic braking circuit by opening of the contacts 15. The dynamic braking relay DBR is energized since power is applied, and the contacts 57 open. Continued energization of the relay 18 is now under the control of position sensing relay 2HR.

As the rotor 30 approaches its desired position the voltage of the lead $L_{10}$ drops until such time that the position sensing relay 2HR energizes. When the relay 2HR energizes, three things occur. Power is temporarily removed from armature; secondly, motor becomes effective; thirdly, the tap lead $L_8$ is switched into the circuit so that the subsequent application of power to the armature will be at a lower level.

When the relay 2HR is energized contacts 56 open and the INDEX MINUS relay 18 is deenergized. Contacts 10 and 11 open, and the dynamic braking circuit through $R_1$ closes. However, the dynamic relay DBR remains energized since, as soon as the power circuit opens, the decelerating armature generates voltage across the resistor $R_2$. With the assistance of the dynamic braking circuit, the armature is slowed down. The voltage across the resistor $R_2$ decreases, and the dynamic braking relay DBR drops out when the armature reaches a predetermined slow speed dependent upon the setting of the slider $S_2$. A circuit is then reestablished for INDEX MINUS relay 18 through contacts 57, and the dynamic braking circuit is interrupted. Contacts 10 and 12 reclose, and a reduced average voltage is applied to the armature M. The speed determined by the setting to the slider $S_2$ is slightly greater than the steady state speed determined by the slider $S_2$ during powered operation. Accordingly the armature coasts until it reaches that steady state speed, and then operates at that speed.

When the rotor 30 passes station 07, the relay 1HR is energized. At this point, the home switch 38 will be in the phantom line position because the turret is not yet in the home position. The contacts 54 will thus be paralleled, maintaining the energization for the main relay IMR. As the relay 1HR energizes, the top lead $L_9$ is substituted in the SCR control circuit as previously described. The motor coasts to a new low speed setting, and continues rotating. Accordingly the armature coasts until it reaches the low speed value thus determined.

As the turret further approaches home position, the cam 37 opens the circuit to the relay IMR, and contacts 46 open, deenergizing the INDEX MINUS relay 18, closure of contacts 57 notwithstanding. Contacts 10 and 11 open. A dynamic braking circuits is then effective through contacts 15 and 16. The motor and turret quickly slow down.

When the home switch 38 closes at its full line position, a circuit is then established for the stop index SIR. The stop index relay SIR deenergizes the start relay SSR. Accordingly the pin retract solenoid 31 is deenergized, and the pin engage solenoid 32 is energized. The locating pin is projected at a time when the speed of the turret is minimal and the angular momentum largely dissipated. The pin itself may then fully stop and position the turret. As the pin engages, switch 35 opens and the turret is clamped. The cycle of operation has thus been concluded and whereby the motor has operated at 3 speeds with 3 "on" states.

Similar circuitry for moving the turret in the opposite direction is provided. Thus main relay IPR has interlock contacts 58 operated by relay IMR. Holding contacts 59 are provided for start switch 39. The relay IPR, interlock contacts 58 and start switches 43, 39, 59 all parallel the other main relay IMR, interlock contacts 55, and start switches 40, 42 and 44. INDEX PLUS relay 17 and control contacts 45 together parallel INDEX MINUS relay 18 and its control contacts 46. Due to this parallelism, all other control elements are common.

In FIG. 3 there is illustrated diagrammatically the operation of the system through stages of large position deviation to home. By adjusting sliders $S_2$, $S_3$, $S_4$, $S_5$, $S_{9a}$ and $S_{9b}$, the curve can be shaped to provide smooth deceleration.

The inventors claim:

1. In apparatus for controlling the indexing movement of a turret having a number of selected positions: means selecting a desired turret position; means dependent upon said selecting means for providing an analog signal corresponding to the deviation of the turret from its selected position; an electric motor; a dynamic braking circuit for said electric motor; a pair of two-state logic elements; first circuit means switching one of said logic elements by said signal means from one state to its other state when said signal means denotes a deviation of the turret from a selected position corresponding to a number of turret stations; second circuit means switching the other of said logic elements by said signal means from one state to its other state when said signal means denotes a deviation of the turret from a selected position corresponding to less than one turret station; three preset means determining three successive speed characteristics of said motor, corresponding to high, medium, and low; means operating said motor at high speed by said selecting means when said first two-state device is in its said one state; means closing said dynamic braking circuit upon switching of said one two-state device to its said other position; means opening said dynamic braking circuit and operating the medium preset means when said motor reduces its speed to a preset value; means operating the low preset means when said second logic element swtiches to its other state; a home switch operated when said turret is at or close to any station; and means operated by the home switch and dependent upon the second logic element being in its said other state for closing said dynamic braking circuit.

2. In apparatus for controlling the indexing movement of a turret having a number of selected positions: means selecting a desired turret position; means dependent upon said selecting means for providing an analog signal corresponding to the deviation of the turret from its selected position; an electric motor; a dynamic braking circuit for said electric motor; a pair of two-state logic elements; first circuit means switching one of said logic elements by said signal means from one state to its other state when said signal means devotes a deviation of the turret from a selected position corresponding to a number of turret stations; second circuit means switching the other of said logic elements by said signal means from one state to its other state when said signal means denotes a deviation of the turret from a selected position corresponding to less than one turret station; three preset means determining three successive speed characteristics of said motor, corresponding to high, medium, and low; means operating said motor at high speed by said selecting means when said first two-state device is in its said one state; means closing said dynamic braking circuit upon switching of said one two-state device to its said other position; means opening said dynamic braking circuit and operating the medium preset means when said motor reduces its speed to a preset value; means operating the low preset means when said second logic element switches to its other state; a locating pin for precisely determining the positions of the turret; a home switch operated when said turret is substantially at any station; means operated by said home switch and dependent upon the second logic element being in its said other state for closing said dynamic braking circuit and projecting said locating pin.

3. In apparatus for controlling the indexing movement of a turret having a number of selected positions: means selecting a desired turrent position; means dependent upon said selecting means for providing an analog signal corresponding to the deviation of the turret from its selected position; a reversible electric motor driving said turret; contactor means for determining the direction of motion of said motor; a dynamic braking circuit for said motor; means selecting a desired direction of motor motion; a pair of two-state logic elements; first circuit means switching one of said logic elements by said signal means from one state to its other state when said signal means denotes a deviation of the turret from a selected position corresponding to a number of turret stations; second circuit means switching the other of said logic elements by said signal means from one state to its other state when said signal means denotes a deviation of the turret from a selected position corresponding to less than one turret station; three preset means determining three successive motor speed characteristics corresponding to high, medium, and low; means operating said motor at high speed and in the selected direction by said selecting means when said first two-state device is in its said one state; means closing said dynamic braking circuit upon switching of said one two-state device to its said other position; means opening said dynamic braking circuit and operating the medium preset means when said motor reduces its speed to a preset value; and means operating the low preset means when said second logic element switches to its other state.

4. In apparatus for controlling the indexing movement of a turret having a number of selected positions: a circular potentiometer resistor; an arm having parts contacting diametrically opposite portions of said resistor; means causing relative movement between the arm and the resistor in accordance with the angular position of the turret; means impressing a potential difference between said arm parts; a plurality of taps connected to said resistor, and corresponding in number and positioning to the number and positioning of turret stations; a signal lead; selector switching means cooperable with said taps and connecting a selected tap to said signal lead; an electric motor; a dynamic braking circuit for said electric motor; a pair of two-state logic elements; first circuit means switching one of said logic elements from one state to its other state when the potential at said signal lead reaches a predetermined value corresponding to a certain deviation of said turret from its selected position; second circuit means switching the other of said logic elements from one state to its other state when the potential at said signal lead reaches a value corresponding to a deviation of the turret from a selected position corresponding to less than one turret station; three preset means determining high, medium, and low characteristic speeds of said electric motor; means operating said motor through one of said preset means corresponding to high speed when said first two-state device is in its said one state; means closing said dynamic braking circuit upon switching of said one two-state device to its said other position; means opening said dynamic braking circuit and connecting said second preset means when said motor reduces its speed to a preset value; and means operating the motor through said third preset means when said second logic element switches to its other state.

5. In apparatus for controlling the indexing movement of a turret having a number of selected positions: a circular potentiometer resistor; an arm having parts contacting diametrically opposite portions of said resistor; means causing relative movement between the arm and the resistor in accordance with the angular position of the turret; means impressing a potential difference between said arms parts; a plurality of taps connected to said resistor, and corresponding in number and positioning to the number and positioning of turret stations; a signal lead; selector switching means cooperable with said taps and connecting a selected tap to said signal lead; an electric motor; a dynamic braking circuit for said electric motor; a pair of two-state logic elements; first circuit means switching one of said logic elements from one state to its other state when the potential at said signal leads reaches a predetermined value corresponding to a certain deviation of said turret from its selection position; second circuit means switching the other of said logic elements from one state to its other state when the potential at said signal lead reaches a value corresponding to a deviation of the turret from a selected position corresponding to less than one turret station; three preset means determining high, medium, and low characteristic speeds of said electric motor; means operating said motor through one of said preset means corresponding to high speed when said first two-state device is in its said one state; means closing said dynamic braking circuit upon switching of said one two-state device to its other said position; means opening said dynamic braking circuit and connecting said second preset means when said motor reduces its speed to a preset value; means operating the motor through said third preset means when said second logic element switches to its other state; a home switch operated when said turret is at or close to any station; and means operated by the home switch and dependent upon the second logic element being in its said other state for closing said dynamic braking circuit.

6. In apparatus for controlling the indexing movement of a turret having a number of selected positions: a circular potentiometer resistor; an arm having parts contacting diametrically opposite portions of said resistor; means causing relative movement between the arm and the resistor in accordance with the angular position of the turret; means impressing a potential difference between said arm parts; a plurality of taps connected to said resistor, and corresponding in number and positioning to the number and positioning of turret stations; a signal lead; selector switching means cooperable with said taps and connecting a selected tap to said signal lead; an electric motor; a dynamic braking circuit for said electric motor; a pair of two-state logic elements; first circuit means switching one of said logic elements from one state to its other state when the potential at said signal lead reaches a predetermined value corresponding to a certain deviation of said turret from its selected position; second circuit means switching the other of said logic elements from one state to its other state when the potential at said signal lead reaches a value corresponding to a deviation of the turret from a selected position corresponding to less than one turret station; three preset means determining high, medium, and low characteristic speeds of said electric motor; means operating said motor through one of said preset means corresponding to high speed when said first two-state device is in its said one state; means closing said dynamic braking circuit upon switching of said one two-state device to its said other position; means opening said dynamic braking circuit and connecting said second preset means when said motor reduces its speed to a preset value; means operating the motor through said third preset means when said second logic element switches to its other state; a locating pin for precisely determining the positions of the turret; a home switch operated when said turret is substantially at any station; and means operated by said home switch and dependent upon the second logic element being in its said other state for closing said dynamic braking circuit and projecting said locating pin.

7. In apparatus for controlling the indexing movement of a turret having a number of selected positions: a direct current motor connected to said turret, and having a speed characteristic dependent upon intensity of energization; three individually adjustable preset circuits for determining three different intensities of energization of said direct current motor; a pair of two-state devices; means switching one of said two-state devices from one state to its other state when the deviation of the turret from a selected position reduces to a predetermined adjustable value corresponding to a number of stations; means switching the other of said two-state devices from one state to its other state when the deviation of the turret from a selected position reduces to a predetermined adjustable value corresponding to less than one station; a dynamic braking circuit for said motor; means driving said motor in accordance with said first preset means when said one two-state device is in its said one state; means closing said dynamic braking circuit and conditioning said motor means for operation in accordance with said second preset means when said one two-state device is in its other state; means for opening said dynamic braking circuit and causing operation of said motor in accordance with said second preset means when said motor speed reduces to an adjusted value approaching that determined by said second preset means; and means causing operation of said motor in accordance with said third preset means when said second two-state device is in its other state.

8. In apparatus for controlling the indexing movement of a turret having a number of selected positions: a direct current motor connected to said turret, and having a speed characteristic dependent upon intensity of energization; three individually adjustable preset circuits for determining three different intensities of energization of said direct current motor; a pair of two-state devices; means switching one of said two-state devices from one state to its other state when the deviation of the turret from a selected position reduces to a predetermined adjustable value corresponding to a number of stations; means switching the other of said two-state devices from one state to its other state when the deviation of the turret from a selected position reduces to a predetermined adjustable value corresponding to less than one station; a dynamic braking circuit for said motor; means driving said motor in accordance with said first preset means when said one two-state device is in its said one state; means closing said dynamic braking circuit and conditioning said motor means for operation in accordance with said second preset means when said one two-state device is in its other state; means for opening said dynamic braking circuit and causing operation of said motor in accordance with said second preset means when said motor speed reduces to an adjusted value approaching that determined by said second preset means; means causing operation of said motor in accordance with said third preset means when said second two-state device is in its other state; a home switch operated when said turret is at or close to any station; and means operated by the home switch and dependent upon said second two-state device being in its said other state for closing said dynamic braking circuit.

9. In apparatus for controlling the indexing movement of a turret having a number of selected positions: a direct current motor connected to said turret, and having a speed characteristic dependent upon intensity of energization; three individually adjustable preset circuits for determining three different intensities of energization of said direct current motor; a pair of two-state devices; means switching one of said two-state devices from one state to its other state when the deviation of the turret from a selected position reduces to a predetermined adjustable value corresponding to a number of stations; means switching the other of said two-state devices from one state to its other state when the deviation of the turret from a selected position reduces to a predetermined adjustable value corresponding to less than one station; a dynamic braking circuit for said motor; means driving said motor in accordance with said first preset means when said one two-state device is in its said one state; means closing said dynamic braking circuit and conditioning said motor means for operation in accordance with said second preset means when said one two-state device is in its other state; means for opening said dynamic braking circuit and causing operation of said motor in accordance with said second preset means when said motor speed reduces to an adjusted value approaching that determined by said second preset means; means causing operation of said motor in accordance with said third preset means when said second two-state device is in its other state; a locating pin for precisely determining the positions of the turret; a home switch operated when said turret is substantially at any station; and means operated by said home switch and dependent upon the second two-state device being in its said other state for closing said dynamic braking circuit and for projecting said locating pin.

10. In apparatus for controlling the indexing movement of a turret having a number of selected positions: means selecting a desired turret position; a positioning pin for precisely positioning said turret; means dependent upon said selecting means for providing a signal corresponding to the deviation of the turret from its selected position; a first two-state logic element switched by said signal providing means from one state to its other state when the deviation of the turret from its selected position reduces to a preset value; said signal providing means including a decoding matrix; a second two-state logic element switched by said signal providing means from one state to its other state when the deviation of the turret from its selected position reduces to another preset value;

motive means for indexing said turret and having a speed characteristic; an SCR motor control switching means for changing the speed characteristic of said motive means in response to operation of said logic elements and means for projecting said positioning pin to lock the turret when in its desired turret position.

11. In apparatus for controlling the indexing movement of a turret having a number of selected positions: means selecting a desired turret position; means dependent upon said selecting means for providing an analog signal corresponding to the deviation of the turret from its selected position; an electric motor; a dynamic braking circuit for said electric motor; a pair of two-state logic elements; first circuit means switching one of said logic elements by said signal means from one state to its other state when said signal means denotes a deviation of the turret from a selected position corresponding to a number of turret stations; a locating pin for precisely positioning the turret; second circuit means switching the other of said logic elements by said signal means from one state to its other state when said signal means denotes a deviation of the turret from a selected position corresponding to less than one turret station; three preset means determining three successive speed characteristics of said motor, corresponding to high, medium, and low; means operating said motor at high speed by said selecting means when said first two-state device is in its said one state; means closing said dynamic braking circuit upon switching of said one two-state device to its said other position; means opening said dynamic braking circuit and operating the medium preset means when said motor reduces its speed to a preset value; said electric motor having an armature which is allowed to coast to a low speed, means for engaging said locating pin to precisely position the turret when it is in the desired position; and means operating the low preset means when said second logic element switches to its other state.

References Cited
UNITED STATES PATENTS

| | | |
|---|---|---|
| 1,768,966 | 7/1930 | Tanner. |
| 2,467,454 | 4/1949 | Arnot. |
| 3,105,142 | 9/1963 | Tripp. |
| 3,114,870 | 12/1963 | Moser et al. |
| 3,223,830 | 12/1965 | Evans. |

ORIS L. RADER, *Primary Examiner.*

THOMAS E. LYNCH, *Assistant Examiner.*

U.S. Cl. X.R.

318—28, 162